(12) United States Patent
Shirooka (10) Patent No.: US 9,242,540 B2
(45) Date of Patent: Jan. 26, 2016

(54) VEHICULAR BATTERY MOUNTING STRUCTURE

(71) Applicant: Masakazu Shirooka, Toyota (JP)

(72) Inventor: Masakazu Shirooka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 149 days.

(21) Appl. No.: 14/346,197

(22) PCT Filed: Sep. 19, 2012

(86) PCT No.: PCT/IB2012/001814
§ 371 (c)(1),
(2) Date: Mar. 20, 2014

(87) PCT Pub. No.: WO2013/041937
PCT Pub. Date: Mar. 28, 2013

(65) Prior Publication Data
US 2014/0231162 A1 Aug. 21, 2014

(30) Foreign Application Priority Data
Sep. 20, 2011 (JP) ................................ 2011-205395

(51) Int. Cl.
*B60K 1/04* (2006.01)
(52) U.S. Cl.
CPC ............ *B60K 1/04* (2013.01); *B60K 2001/0438* (2013.01)
(58) Field of Classification Search
CPC ............. B60K 1/04; B60K 2001/0438; B60K 2001/0472; B60L 11/1877
See application file for complete search history.

(56) References Cited

U.S. PATENT DOCUMENTS

| 4,365,681 A * | 12/1982 | Singh ..................... B60K 1/04 105/51 |
| 5,555,950 A * | 9/1996 | Harada ............... H01M 2/1083 180/232 |
| 5,921,578 A * | 7/1999 | Sekita ..................... B60G 3/14 280/781 |
| 7,824,797 B2 * | 11/2010 | Nishino ................... B60K 1/04 429/154 |

(Continued)

FOREIGN PATENT DOCUMENTS

| JP | 7 156826 | 6/1995 |
| JP | 07156826 A * | 6/1995 |

(Continued)

OTHER PUBLICATIONS

International Search Report Issued Jan. 31, 2013 in PCT/IB12/001814 Filed Sep. 19, 2012.

*Primary Examiner* — Katy M Ebner
(74) *Attorney, Agent, or Firm* — Oblon, McClelland, Maier & Neustadt, L.L.P.

(57) ABSTRACT

In a vehicular battery mounting structure, a rear suspension beam has a beam main body portion extending in a vehicle width direction, and a beam end portion formed on an outside of the beam main body portion in the vehicle width direction. A sectional area of the beam end portion viewed from a side is larger than the beam main body portion. Also, a backboard forming a rear portion of a battery frame has a board main body portion that extends in the vehicle width direction and is arranged in front of the beam main body portion. A vehicle body attaching portion attached to a vehicle body frame is provided on an end portion on the outside of the board main body portion. The vehicle body attaching portion is arranged in front of the end portion on the outside of the beam main body portion, and opposing the end portion.

6 Claims, 5 Drawing Sheets

(56) References Cited

U.S. PATENT DOCUMENTS

| | | | | |
|---|---|---|---|---|
| 8,393,426 B2* | 3/2013 | Takahashi | ............... | B60K 1/04 180/68.5 |
| 8,464,817 B2* | 6/2013 | Usami | ............... | B60K 1/04 180/68.5 |
| 8,522,909 B2* | 9/2013 | Niina | ............... | B60K 1/00 180/291 |
| 8,556,016 B2* | 10/2013 | Yoda | ............... | B60K 1/04 180/65.31 |
| 8,585,132 B2* | 11/2013 | Klimek | ............... | B60K 1/04 296/187.08 |
| 8,657,350 B2* | 2/2014 | Cabo | ............... | B60K 1/04 180/69.1 |
| 8,739,907 B2* | 6/2014 | Storc | ............... | B60K 1/04 180/65.29 |
| 8,776,920 B2* | 7/2014 | Suzuki | ............... | B60K 1/02 180/291 |
| 8,776,925 B2* | 7/2014 | Bender | ............... | B60K 1/04 180/68.5 |
| 2006/0289224 A1 | 12/2006 | Ono et al. | | |
| 2013/0153318 A1 | 6/2013 | Shirooka et al. | | |

FOREIGN PATENT DOCUMENTS

| | | |
|---|---|---|
| JP | 2001-138753 A | 5/2001 |
| JP | 2009-83597 A | 4/2009 |
| JP | 2009 87774 | 4/2009 |
| JP | 2011 73581 | 4/2011 |
| JP | 2012 56336 | 3/2012 |
| JP | 2012 71763 | 4/2012 |

* cited by examiner

VEHICULAR BATTERY MOUNTING STRUCTURE

BACKGROUND OF THE INVENTION

1. Field of the Invention

The invention relates to a vehicular battery mounting structure.

2. Description of Related Art

Japanese Patent Application Publication No. 2009-87774 (JP 2009-87774 A), Japanese Patent Application Publication No. 2011-73581 (JP 2011-73581 A), and Japanese Patent Application Publication No. 7-156826 (JP 7-156826 A), for example, each describe a vehicular battery mounting structure in which a battery is mounted below a floor of a vehicle.

However, in this kind of structure, the battery may be arranged close to a rear suspension beam that connects a pair of left and right rear suspension arms together. In this case, when the vehicle is collided with from the rear (i.e., in a rear-end collision), the rear suspension beam that moves toward the front of the vehicle as a result of this rear-end collision may encroach on the battery frame that supports the battery.

Therefore, in order to protect the battery, it is necessary to restrict the movement of the rear suspension beam toward the front of the vehicle when a rear-end collision occurs. Also, normally in a vehicle body structure, it is desirable to reduce both the weight and cost.

SUMMARY OF THE INVENTION

The invention thus provides a vehicular battery mounting structure capable of protecting a battery when a rear-end collision occurs, while reducing weight and cost.

A first aspect of the invention relates to a vehicular battery mounting structure that includes a rear suspension beam that connects a pair of left and right rear suspension arms that support rear wheels, the vehicular battery mounting structure having a beam main body portion that extends in a vehicle width direction and a beam end portion that is formed on an outside in the vehicle width direction of the beam main body portion and a sectional area of the beam end portion being larger than the beam main body portion in a sectional view taken along a vehicle longitudinal direction; a backboard that forms a rear portion of a battery frame that supports a battery under a floor of the vehicle, the backboard having a board main body portion that extends in the vehicle width direction and being arranged in front of, in a vehicle longitudinal direction, the beam main body portion; and a vehicle body attaching portion that is provided on an end portion on the outside of the board main body portion in the vehicle width direction, and arranged in front of, in the vehicle longitudinal direction, the end portion on the outside of the beam main body portion in the vehicle width direction, and opposing the end portion of the beam main body portion.

With this vehicular battery mounting structure, the rear suspension beam includes the beam main body portion that extends in the vehicle width direction, and the beam end portion that is formed on the outside of this beam main body portion in the vehicle width direction and has a sectional area that is larger than the beam main body portion in a sectional view taken along the vehicle longitudinal direction. Also, the backboard that forms the rear portion of the battery frame has the board main body portion that extends in the vehicle width direction and is arranged in front of, in the vehicle longitudinal direction, the beam main body portion. The vehicle body attaching portion that is attached to the vehicle body frame is provided on the end portion on the outside of this board main body portion in the vehicle width direction. This vehicle body attaching portion is arranged in front of, in the vehicle longitudinal direction, the end portion on the outside of the beam main body portion in the vehicle width direction, and opposing this end portion.

Therefore, when the vehicle is rear-ended and the rear suspension beam consequently moves toward the front of the vehicle, the end portion on the outside of the beam main body portion in the vehicle width direction abuts against the vehicle body attaching portion. As a result, movement of the rear suspension beam toward the front of the vehicle is restricted, so the battery can be protected.

Moreover, the beam main body portion on the outside in the vehicle width direction of the beam main body portion that has abutted against the vehicle body attaching portion described above is formed with a smaller sectional area than the beam end portion. Therefore, for example, compared with when the end portion on the outside in the vehicle width direction of the beam main body portion is formed with a large sectional area like the beam end portion, the vehicle body attaching portion and the board main, body portion do not have to be that rigid. As a result, both weight and cost are able to be reduced.

According to this vehicle battery mounting structure, the battery is able to be protected when a rear-end collision occurs, while reducing both weight and cost.

With this vehicular battery mounting structure, the beam end portion bends and deforms toward the front of the vehicle with a connecting portion between the beam end portion and the beam main body portion as the point of origin, as a result of the rear wheels continuing to be pushed toward the front of the vehicle by a collision body when a rear-end collision occurs.

In the vehicular battery mounting structure according to the aspect described above, at least a portion of the board main body portion in a vehicle vertical direction may overlap in the vehicle vertical direction with the beam main body portion, and the backboard may have a board end portion that is formed on the outside of the board main body portion in the vehicle width direction and arranged in front of, in the vehicle longitudinal direction, the beam end portion, and in which an overlap amount in the vehicle vertical direction between the rear suspension beam and the board end portion is less than an overlap amount in the vehicle vertical direction between the rear suspension beam and the board main body portion.

With this vehicular battery mounting structure, the board end portion of the backboard is formed such that the overlap amount in the vehicle vertical direction between the rear suspension beam and the board end portion is less than the overlap amount in the vehicle vertical direction between the rear suspension beam and the board main body portion. Therefore, as described above, when the beam end portion bends and deforms toward the front of the vehicle with the connecting portion between the beam end portion and the beam main body portion as the point of origin, the beam end portion is able to more easily get by the board end portion, compared with when the overlap amount in the vehicle vertical direction between the board end portion and the rear suspension beam is the same as the overlap amount in the vehicle vertical direction between the board main body portion and the rear suspension member, for example. Therefore, it is possible to suppress a load from being input from the beam end portion into the board end portion, so the board end portion does not have to be that rigid. As a result, both the weight and cost are able to be reduced even more.

In the vehicular battery mounting structure described above, the board end portion may have an outer end portion that is arranged offset in the vehicle vertical direction with respect to the beam end portion, and a middle portion that is formed between the outer end portion and the board main body portion. Also, one of edge portions at both sides of the middle portion in the vehicle vertical direction is continuous with an edge portion at the beam end portion side of the outer end portion in the vehicle vertical direction, and the one edge portion of the middle portion may be inclined with respect to the vehicle width direction, and at least an inner portion, in the vehicle width direction, of the one of edge portion of the middle portion may overlap in the vehicle vertical direction with the beam end portion.

With this vehicular battery mounting structure, the outer end portion of the board end portion is arranged offset in the vehicle vertical direction with respect to the beam end portion. Also, the middle portion is formed between this outer end portion and the board main body portion. One of edge portions at both sides of the middle portion in the vehicle vertical direction is continuous with the edge portion at the beam end portion side of the outer end portion in the vehicle vertical direction, and the one edge portion of the middle portion is inclined with respect to the vehicle width direction. At least an inner portion, in the vehicle width direction, of one of edge portion of the middle portion overlaps in the vehicle vertical direction with the beam end portion.

Accordingly, when the beam end portion bends and deforms toward the front of the vehicle with the connecting portion between the beam end portion and the beam main body portion as the point of origin as described above, this beam end portion contacts the inclined edge portion of the middle portion, so this beam end portion is inhibited from being displaced toward the board end portion side in the vehicle vertical direction. As a result, this beam end portion smoothly slips by the board end portion, so the load from the beam end portion is able to be even more effectively suppressed from being input to the board end portion.

In the vehicular battery mounting structure described above, in a sectional view taken along the vehicle longitudinal direction, a sectional area of the beam end portion may be larger than the beam main body portion as a result of a dimension in the vehicle longitudinal direction of the beam end portion being larger than the beam main body portion.

With this vehicular battery mounting structure, in the sectional view taken along the vehicle longitudinal direction, the sectional area is larger than the beam main body portion as a result of the dimension in the vehicle longitudinal direction of the beam end portion being larger than the beam main body portion. Therefore, for example, the beam end portion is able to be made smaller in the vehicle vertical direction, compared with when the sectional area in the sectional view taken along the vehicle longitudinal direction is larger than the beam main body portion as a result of the dimension in the vehicle vertical direction of the beam end portion being larger than the beam main body portion. Therefore, when the beam end portion bends and deforms toward the front of the vehicle with the connecting portion between the beam end portion and the beam main body portion as the point of origin as described above, this beam end portion is able to slip by the board end portion even more easily.

As described in detail above, according to the vehicular battery mounting structure of the invention, it is possible to protect a battery when a rear-end collision occurs, while reducing weight and cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment of the invention will be described with reference to the accompanying drawings. In the drawings, arrows UP, FR, and LH, indicate directions upward in the vertical direction of the vehicle, toward the front in the longitudinal direction of the vehicle, and toward an outside (the left side) in the vehicle width direction, respectively. Accordingly, in the description below, all directions are to be understood as being with respect to the vehicle. For example, outside and inside are with respect to the vehicle width direction, above and below are with respect to the vehicle vertical direction, and front and rear are with respect to the vehicle longitudinal direction, unless otherwise stated.

First, the structure of the vehicular battery mounting structure according to this example embodiment of the invention will be described. To simplify the description, portions that are provided in plurality (such as on each side of the vehicle) may be referred to in the singular.

Figure 1:
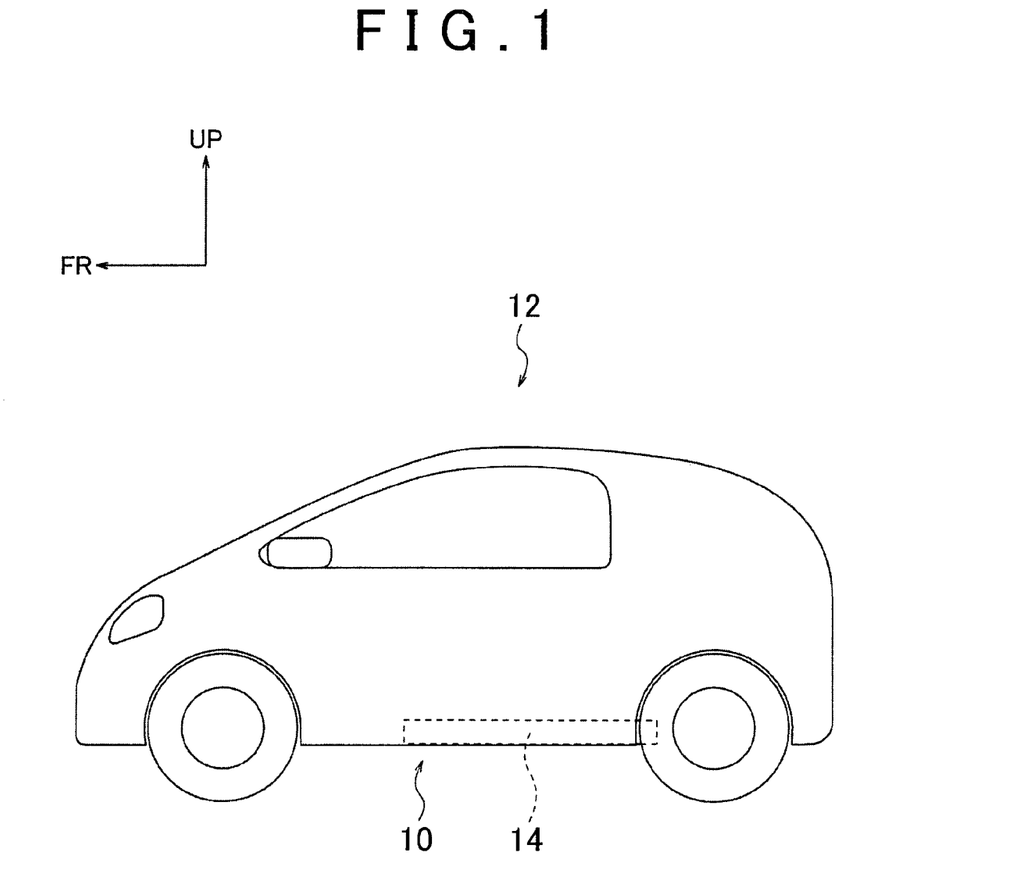
FIG. 1 is a side view of a vehicle to which a vehicular battery mounting structure according to one example embodiment of the invention has been applied.

A vehicle 12 shown in FIG. 1 is an electric vehicle that runs using an electric motor, not shown, as a driving source. A battery 14 that stores electric power to be supplied to the electric motor is mounted below a floor of this vehicle 12. Also, a vehicle battery mounting structure 10 according to this example embodiment of the invention is applied to this vehicle 12.

Figure 2:
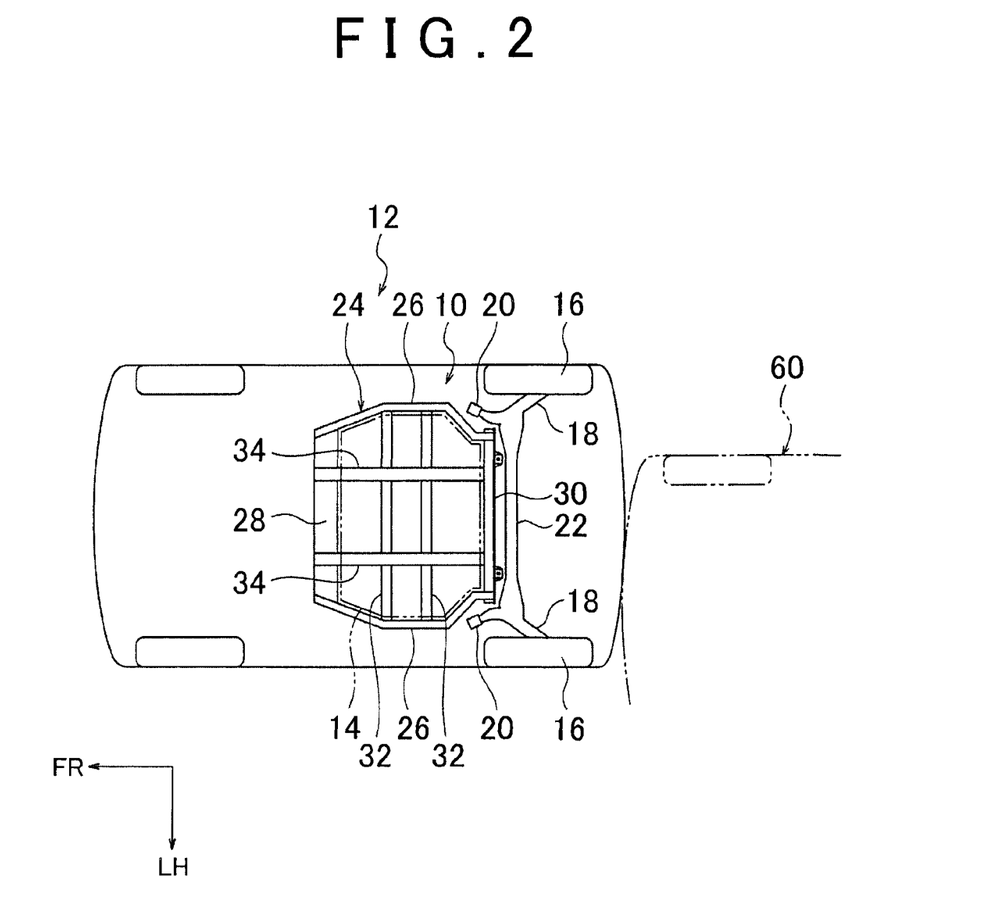
FIG. 2 is a plan view of the vehicle shown in FIG. 1.

That is, as shown in FIG. 2, a pair of left and right rear suspension arms 18 that supports rear wheels 16 is provided at a rear portion of the vehicle 12. This pair of left and right rear suspension arms 18 extends in the vehicle longitudinal direction.

A bush 20 is provided on a front end portion of each rear suspension arm 18. These bushes 20 are rotatably attached to a vehicle body frame, not shown. Also, the rear wheels 16 are rotatably attached to rear end portions of the rear suspension arms 18.

Center portions in the vehicle longitudinal direction of this pair of left and right rear suspension arms 18 are connected together by a rear suspension beam 22 that extends in the vehicle width direction. The rear suspension beam 22 and the rear suspension arms 18 together form a torsion beam type suspension system, as an example.

A frame-shaped battery frame 24 that supports the battery 14 from below is arranged below the floor of the vehicle 12, in front of the rear suspension beam 22. This battery frame 24 has a pair of left and right battery side frames 26, a battery front frame 28, and a battery rear frame 30.

The pair of left and right battery side frames 26 forms left and right side portions of the battery frame 24. This pair of left and right battery side frames 26 extends in the vehicle longitudinal direction, and is arranged apart from one other in the vehicle width direction. The battery front frame 28 forms a front portion of the battery frame 24. This battery front frame 28 extends in the vehicle width direction, and is connected to front end portions of the pair of left and right battery side frames 26.

Also, the battery rear frame 30 forms a rear portion of the battery frame 24. This battery rear frame 30 extends in the vehicle width direction, and is connected to rear end portions of the pair of left and right battery side frames 26.

A plurality (two in this example embodiment) of battery sub frames 32 that extend in the vehicle width direction and are arranged apart from each other in the vehicle longitudinal direction are provided between the pair of left and right battery side frames 26. Also, the pair of left and right battery side frames 26 is connected together by these battery sub frames 32, thus ensuring the rigidity of the battery frame 24.

A battery under cover 34 that covers the battery 14 from below is attached to the underside of the battery frame 24. A plurality (two in this example embodiment) of these battery under covers 34 extend in the vehicle longitudinal direction and are arranged apart from each other in the vehicle width direction. These battery under covers 34 are joined by welding or the like to the battery front frame 28, the battery sub frames 32, and the battery rear frame 30.

Figure 3:
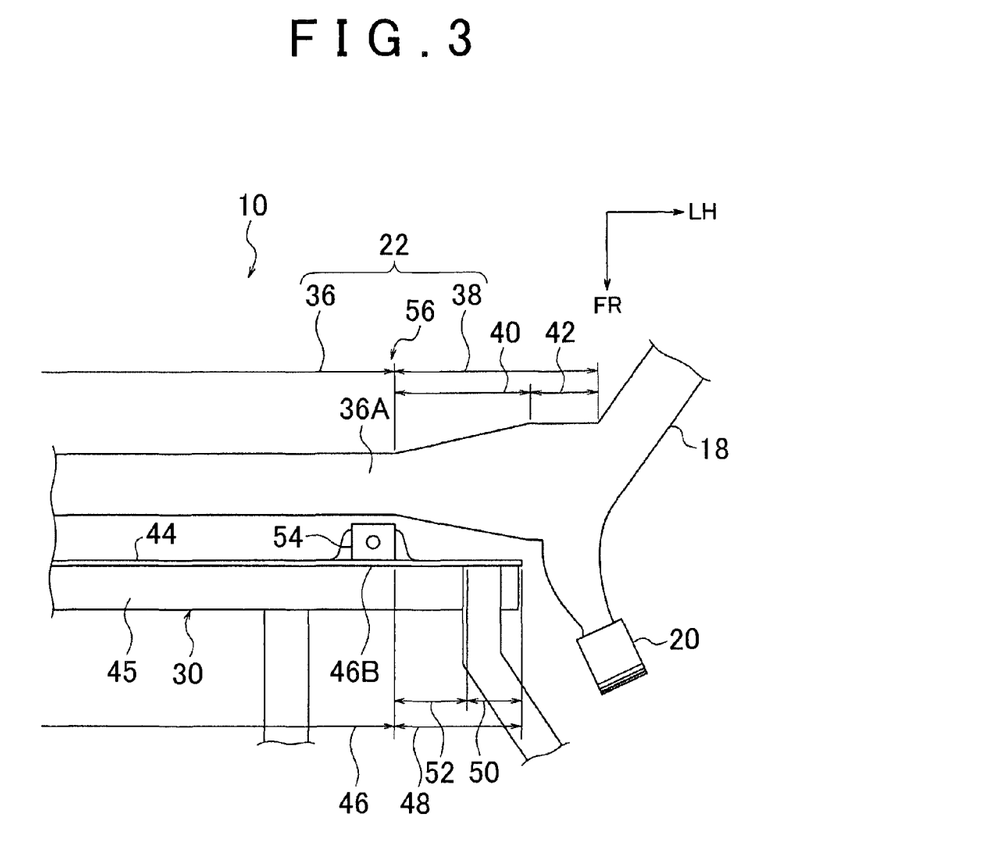
FIG. 3 is an enlarged view of the main portions of the vehicular battery mounting structure shown in FIG. 2.
Figure 4:
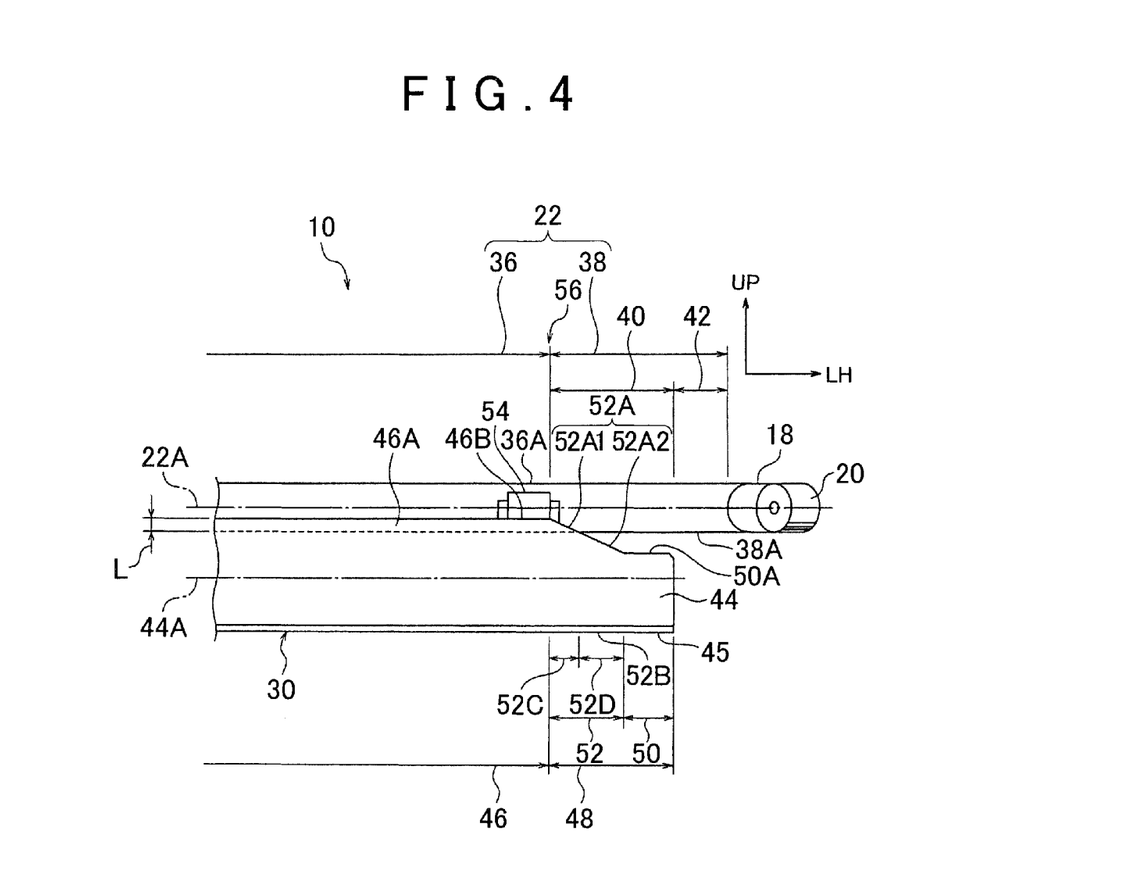
FIG. 4 is a front view of the vehicular battery mounting structure shown in FIG. 3.

Also, more specifically, this vehicle battery mounting structure 10 is structured as described below. That is, as shown in FIGS. 3 and 4, the rear suspension beam 22 has a beam main body portion 36 that extends in the vehicle width direction, and a beam end portion 38 that is formed on the outside in the vehicle width direction of this beam main body portion 36. The beam main body portion 36 is formed with a substantially constant cross section in the vehicle width direction.

On the other hand, the beam end portion 38 has a tapered portion 40 that is connected to an end portion 36A on the outside in the vehicle width direction of the beam main body portion 36, and a connecting portion 42 that is formed on the outside in the vehicle width direction of this tapered portion 40 and is connected to the rear suspension arms 18. The dimension in the vehicle longitudinal direction of the tapered portion 40 becomes gradually larger toward the outside in the vehicle width direction. The connecting portion 42 is formed with the same cross section as the end portion on the outside in the vehicle width direction of the tapered portion 40. The cross section of this connecting portion 42 is substantially constant in the vehicle width direction.

Also, as a result of the tapered portion 40 and the connecting portion 42 being formed as described above, the sectional area, in the sectional view taken long the vehicle longitudinal direction, of the beam end portion 38 that is formed by the tapered portion 40 and the connecting portion 42 is larger than the beam main body portion 36. The dimension in the vehicle vertical direction of this beam end portion 38 is substantially constant in the vehicle width direction (see FIG. 4). The sectional area of the beam end portion 38 in the sectional view taken along the vehicle longitudinal direction is larger than the beam main body portion 36 as a result of the dimension in the vehicle longitudinal direction of this beam end portion 38 being larger than the beam main body portion 36 (see FIG. 3).

The battery rear frame 30 includes a backboard 44 that extends in the vehicle width direction with the vehicle longitudinal direction as the plate thickness direction, and an under board 45 that extends toward the front of the vehicle from a lower end portion of this backboard 44. The battery rear frame 30 is formed in a sectional L-shape in the sectional view taken along the vehicle longitudinal direction. The backboard 44 has a board main body portion 46 that extends in the vehicle width direction, and a board end portion 48 that is formed on the outside in the vehicle width direction of this board main body portion 46.

This board main body portion 46 is arranged in front of the beam main body portion 36. The entire backboard 44 that includes this board main body portion 46 is arranged such that a center portion 44A thereof in the vehicle vertical direction is offset downward with respect to a center portion 22A in the vehicle vertical direction of the rear suspension beam 22, as shown in FIG. 4. Also, an upper portion 46A of the board main body portion 46 overlaps in the vehicle vertical direction with the beam main body portion 36. In other words, a portion of the board main body portion 46 overlaps with a portion of the beam main body portion 36 in the view seen from the front of the vehicle. This overlap amount is denoted by reference character L.

Meanwhile, the board end portion 48 is arranged in front of the beam end portion 38. This board end portion 48 has an outer end portion 50 that forms an end portion on the outside in the vehicle width direction of the backboard 44, and a middle portion 52 that is formed between this outer end portion 50 and the board main body portion 46.

The outer end portion 50 is arranged offset downward in the vehicle vertical direction overall with respect to the beam end portion 38. That is, an edge portion 50A on an upper side of the outer end portion 50 (i.e., the beam end portion 38 side in the vehicle vertical direction) is arranged lower than an edge portion 38A on an underside of the beam end portion 38.

Also, of edge portions 52A and 52B on both sides in the vehicle vertical direction of the middle portion 52, the edge portion 52A on the upper side (i.e., the edge portion that is continuous with the edge portion 50A of the outer end portion 50 described above) is inclined, with respect to the vehicle width direction in the view seen from the front of the vehicle, downward toward the outside in the vehicle width direction. Also, a portion 52A1 on the inside in the vehicle width direction of this edge portion 52A overlaps in the vehicle vertical direction with the beam end portion 38.

In this way, the edge portion 50A on the upper side of the outer end portion 50 is positioned lower than the edge portion 38A on the underside of the beam end portion 38. The edge portion 52A on the upper side of the middle portion 52 that is continuous with the edge portion 50A is inclined, with respect to the vehicle width direction in the view seen from the front of the vehicle, downward toward the outside in the vehicle width direction. Accordingly, the overlap amount in the vehicle vertical direction between the rear suspension beam 22 and the board end portion 48 that is formed by this outer end portion 50 and the middle portion 52 is less than the overlap amount in the vehicle vertical direction between the rear suspension beam 22 and the board main body portion 46.

That is, as described above, the portion 52A 1 on the inside in the vehicle width direction of the edge portion 52A is inclined with respect to the vehicle width direction in the view seen from the front of the vehicle. Therefore, while the overlap amount in the vehicle vertical direction between the beam main body portion 36 and the upper portion 46A of the board main body portion 46 is L, the overlap amount in the vehicle vertical direction between the beam main body portion 36 and a portion 52C that includes the portion 52 A 1 of the edge portion 52 A of the middle portion 52 is smaller than the overlap amount L.

Also, a residual portion 52A2 of the edge portion 52A and the outer end portion 50 on the upper side of the outer end portion 50 are both positioned lower than the edge portion 38A on the underside of the beam end portion 38. Therefore, an overlap amount in the vehicle vertical direction between the beam main body portion 36 and a portion 52D that includes the residual portion 52A2 of the middle portion 52, and an overlap amount in the vehicle vertical direction between the beam main body portion 36 and the outer end portion 50 are both zero.

Also, a vehicle body attaching portion 54 is attached to the end portion 46B on the outside in the vehicle width direction of the board main body portion 46 described above. The battery frame 24 described above (see FIG. 2) is attached to a vehicle body frame, not shown, by this vehicle body attaching portion 54 and another vehicle body attaching portion, not shown, provided on the battery frame 24. This vehicle body attaching portion 54 protrudes toward the rear of the vehicle from the end portion 46B on the outside in the vehicle width direction of the board main body portion 46, as shown in FIG. 3. Also, this vehicle body attaching portion 54 is positioned in front of the end portion 36A on the outside in the vehicle width direction of the beam main body portion 36, and opposing this end portion 36A.

Next, the operation and effects of the vehicle battery mounting structure 10 according to this example embodiment of the invention will be described.

As shown in FIGS. 3 and 4, with this vehicle battery mounting structure 10, the rear suspension beam 22 includes the beam main body portion 36 that extends in the vehicle width direction, and the beam end portion 38 that is formed on the outside in the vehicle width direction of this beam main body portion 36 and has a sectional area that is larger than the beam main body portion 36 in the sectional view taken along the vehicle longitudinal direction. Also, the backboard 44 that forms the rear portion of the battery frame 24 includes the board main body portion 46 that extends in the vehicle width direction and is arranged in front of the beam main body portion 36. The vehicle body attaching portion 54 that is attached to the vehicle body frame is provided on the end portion 46B on the outside in the vehicle width direction of this board main body portion 46. This vehicle body attaching portion 54 is arranged in front of the end portion 36A on the outside in the vehicle width direction of the beam main body portion 36, and opposing this end portion 36A.

Figure 5:
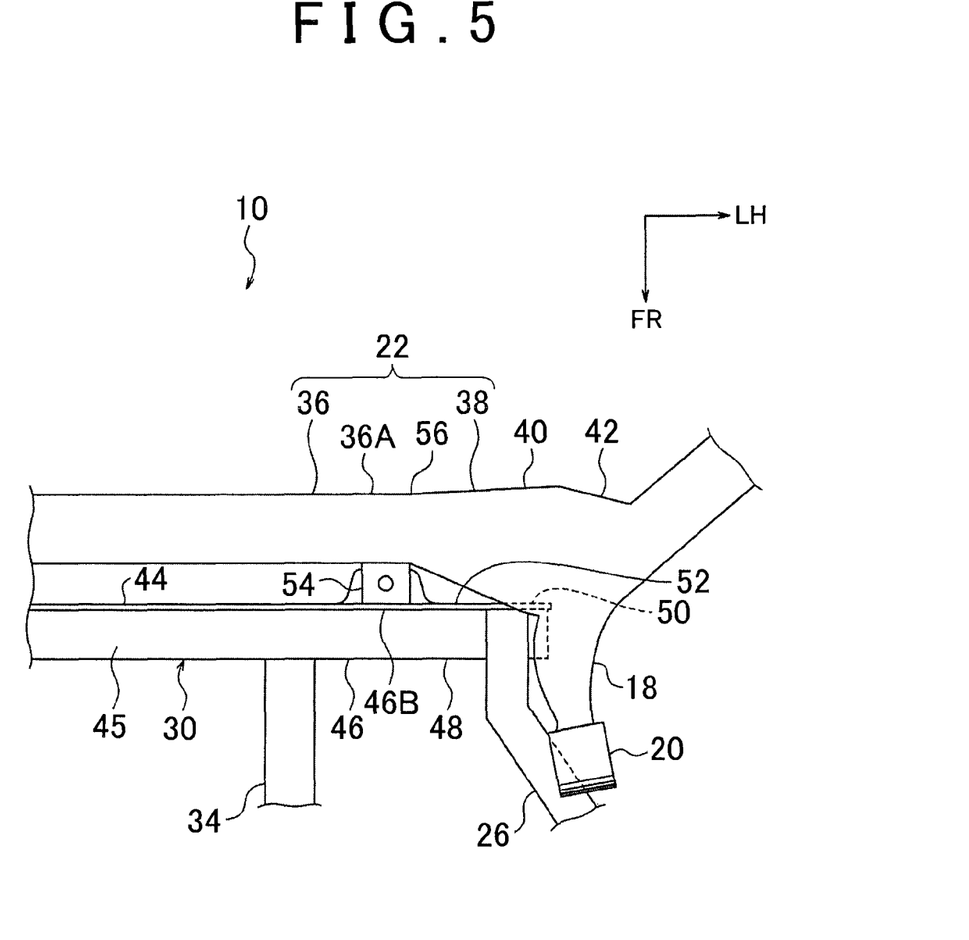
FIG. 5 is a view showing the state of the vehicular battery mounting structure shown in FIG. 4 when a rear-end collision occurs.

Therefore, when the vehicle 12 is rear-ended (i.e., is collided with from the rear in either a full-lap collision or an offset collision) and the rear suspension beam 22 consequently moves toward the front of the vehicle, the end portion 36A on the outside in the vehicle width direction of the beam main body portion 36 abuts against the vehicle body attaching portion 54, as shown in FIG. 5. As a result, movement of the rear suspension beam 22 toward the front of the vehicle is restricted, so the battery 14 can be protected.

Moreover, the end portion 36A on the outside in the vehicle width direction of the beam main body portion 36 that has abutted against the vehicle body attaching portion 54 described above is formed with a smaller sectional area than the beam end portion 38. Therefore, for example, compared with when the end portion 36A on the outside in the vehicle width direction of the beam main body portion 36 is formed with a large sectional area like the beam end portion 38, the vehicle body attaching portion 54 and the board main body portion 46 do not have to be that rigid. As a result, both weight and cost are able to be reduced.

As described above, according to this vehicle battery mounting structure 10, the battery 14 is able to be protected when a rear-end collision occurs, while reducing both weight and cost.

In particular, with this vehicle 12, when a collision body 60 (i.e., a trailing vehicle) collides from the rear in an offset manner with the rear of the vehicle 12, as shown in FIG. 2, the rear wheels 16 may continue to be pushed in toward the front of the vehicle by this collision body 60. In this case, the beam end portion 38 will bend and deform toward the front of the vehicle with a connecting portion 56 between the beam end portion 38 and the beam main body portion 36 as the point of origin, as shown in FIG. 5.

However, with this vehicle battery mounting structure 10, the board end portion 48 of the backboard 44 is formed such that the overlap amount in the vehicle vertical direction between the rear suspension beam 22 and the board end portion 48 is less than the overlap amount in the vehicle vertical direction between the rear suspension beam 22 and the board main body portion 46 (see FIG. 4). Therefore, as described above, when the beam end portion 38 bends and deforms toward the front of the vehicle, the beam end portion 38 is able to more easily get by the board end portion 48, compared with when the overlap amount in the vehicle vertical direction between the board end portion 48 and the rear suspension beam 22 is the same as the overlap amount in the vehicle vertical direction between the board main body portion 46 and the rear suspension beam 22, for example.

That is, in other words, it is possible to inhibit the beam end portion 38 from bumping into the board end portion 48. Therefore, it is possible to suppress a load from the beam end portion 38 from being input to the board end portion 48, so the board end portion 48 does not have to be that rigid. As a result, both the weight and cost are able to be reduced even more.

Also, the rear suspension arms 18 is arranged in a position that is the same height as the beam end portion 38 (see FIG. 4). Therefore, when the beam end portion 38 bends and deforms toward the front of the vehicle as described above, the rear suspension arms 18 are also able to be inhibited from bumping into the board end portion 48.

Also, as shown in FIG. 4, the outer end portion 50 of the board end portion 48 is arranged offset in the vehicle vertical direction with respect to the beam end portion 38. Also, the middle portion 52 is formed between this outer end portion 50 and the board main body portion 46. Of the edge portions 52A and 52B on both sides in the vehicle vertical direction of this middle portion 52, the edge portion 52A that is continuous with the edge portion 50A on the upper side of the outer end portion 50 is inclined with respect to the vehicle width direction in the view seen from the front of the vehicle, and the portion 52A1 thereof that is on the inside in the vehicle width direction overlaps in the vehicle vertical direction with the beam end portion 38.

Accordingly, when the beam end portion 38 bends and deforms toward the front of the vehicle as described above, this beam end portion 38 contacts the inclined edge portion 52A of the middle portion 52, so this beam end portion 38 is inhibited from being displaced downward. As a result, this beam end portion 38 smoothly slips by the board end portion 48, so the load from the beam end portion 38 is able to be even more effectively suppressed from being input to the board end portion 48.

Moreover, the sectional area of the beam end portion 38 in the sectional view taken along the vehicle longitudinal direction is larger than the beam main body portion 36 as a result of the dimension in the vehicle longitudinal direction of the beam end portion 38 being larger than the beam main body portion 36. Therefore, for example, the beam end portion 38 is able to be made smaller in the vehicle vertical direction, compared with when the sectional area of the beam end portion 38 in the sectional view taken along the vehicle longitudinal direction is larger than the beam main body portion 36 as a result of the dimension in the vehicle vertical direction of the beam end portion 38 being larger than the beam main body portion 36. Therefore, when the beam end portion 38 bends and deforms toward the front of the vehicle as described above, this beam end portion 38 is able to slip by the board end portion 48 even more easily.

Even if the beam end portion 38 bends and deforms toward the front of the vehicle and this beam end portion 38 slips by the board end portion 48, if the rigidity of the vehicle body attaching portion 54 is ensured, the end portion 36A on the outside in the vehicle width direction of the beam main body portion 36 is able to be reliably stopped by this vehicle body attaching portion 54. Therefore, movement of the rear suspension beam 22 toward the front of the vehicle is restricted, so the battery 14 is able to be protected.

Next, a modified example of the vehicle battery mounting structure 10 according to the example embodiment of the invention will be described.

In the example embodiment described above, the board main body portion 46 overlaps in the vehicle vertical direction with the beam main body portion 36 only at the upper portion 46A thereof, as shown in FIG. 4. However, the entire board main body portion 46 in the vehicle vertical direction may also overlap in the vehicle vertical direction with the beam main body portion 36.

Also, the backboard 44 is arranged such that the center portion 44A thereof in the vehicle vertical direction is offset downward with respect to the center portion 22A in the vehicle vertical direction of the rear suspension beam 22. However, the backboard 44 may also be arranged so that the center portion 44A thereof in the vehicle vertical direction is offset upward with respect to the center portion 22A in the vehicle vertical direction of the rear suspension beam 22.

Also, the edge portion 52A overlaps in the vehicle vertical direction with the beam end portion 38 only at the portion 52A1 thereof on the inside in the vehicle width direction. However, the entire edge portion 52A may also overlap in the vehicle vertical direction with the beam end portion 38 (that is, the residual portion 52A2 of the edge portion 52A may also overlap in the vehicle vertical direction with the beam end portion 38).

Also, the battery rear frame 30 is formed in a sectional L-shape in the sectional view taken along the vehicle longitudinal direction, but the battery rear frame 30 may also be formed in another sectional shape as long as it is a structure that has the backboard 44.

Also, the sectional area of the beam end portion 38 in the sectional view taken along the vehicle longitudinal direction is larger than the beam main body portion 36 as a result of the dimension in the vehicle longitudinal direction of the beam end portion 38 being larger than the beam main body portion 36. However, the sectional area of the beam end portion 38 may also be larger than the beam main body portion 36 as a result of the dimension in the vehicle vertical direction of the beam end portion 38 being larger than the beam main body portion 36, or as a result of the dimensions in the vehicle vertical direction and the vehicle longitudinal direction of the beam end portion 38 being larger than the beam main body portion 36.

While the invention has been described with reference to example embodiments thereof, it should be understood that the invention is not limited to the example embodiments. The invention may of course be carried out in other modes that have been modified or improved in any of a variety of ways without departing from the scope thereof.

The invention claimed is:

1. A vehicular battery mounting structure comprising:
  a rear suspension beam that connects a pair of left and right rear suspension arms that support rear wheels, the rear suspension beam having a beam main body portion that extends in a vehicle width direction and a beam end portion that is formed on an outside in the vehicle width direction of the beam main body portion, and a sectional area of the beam end portion being larger than the beam main body portion in a sectional view taken along a vehicle longitudinal direction;
  a backboard that forms a rear portion of a battery frame that supports a battery under a floor of the vehicle, the backboard having a board main body portion that extends in the vehicle width direction and being arranged in front of the beam main body portion in the vehicle longitudinal direction; and
  a vehicle body attaching portion that is provided on an end portion on the outside of the board main body portion in the vehicle width direction, and arranged in front of, in the vehicle longitudinal direction, the end portion on the outside of the beam main body portion in the vehicle width direction, and opposing the end portion of the beam main body portion.

2. The vehicular battery mounting structure according to claim 1, wherein:
  at least a portion of the board main body portion in a vehicle vertical direction overlaps in the vehicle vertical direction with the beam main body portion; and
  the backboard has a board end portion that is formed on the outside of the board main body portion in the vehicle width direction and arranged in front of, in the vehicle longitudinal direction, the beam end portion, and in which an overlap amount in the vehicle vertical direction between the rear suspension beam and the board end portion is less than an overlap amount in the vehicle vertical direction between the rear suspension beam and the board main body portion.

3. The vehicular battery mounting structure according to claim 2, wherein:
  the board end portion has an outer end portion that is arranged offset in the vehicle vertical direction with respect to the beam end portion, and a middle portion that is formed between the outer end portion and the board main body portion;
  one of edge portions at both sides of the middle portion in the vehicle vertical direction is continuous with an edge portion at the beam end portion side of the outer end portion in the vehicle vertical direction, and the one edge portion of the middle portion is inclined with respect to the vehicle width direction; and
  at least an inner portion, in the vehicle width direction, of the one edge portion of the middle portion overlaps in the vehicle vertical direction with the beam end portion.

4. The vehicular battery mounting structure according to claim 3, wherein, in the sectional view taken along the vehicle longitudinal direction, the sectional area of the beam end portion is larger than the beam main body portion as a result of a dimension of the beam end portion in the vehicle longitudinal direction being larger than the beam main body portion.

5. The vehicular battery mounting structure according to claim 2, wherein, in the sectional view taken along the vehicle longitudinal direction, the sectional area of the beam end portion is larger than the beam main body portion as a result of a dimension of the beam end portion in the vehicle longitudinal direction being larger than the beam main body portion.

6. The vehicular battery mounting structure according to claim 1, wherein, in the sectional view taken along the vehicle longitudinal direction, the sectional area of the beam end portion is larger than the beam main body portion as a result of a dimension of the beam end portion in the vehicle longitudinal direction being larger than the beam main body portion.

* * * * *